US009147941B2

(12) United States Patent
Zhang

(10) Patent No.: US 9,147,941 B2
(45) Date of Patent: Sep. 29, 2015

(54) ANTENNA GROUNDED WITH U-SHAPED HIGH-IMPEDANCE SURFACE METAL STRIPS AND ITS WIRELESS COMMUNICATION DEVICE

(75) Inventor: Lian Zhang, Guangdong (CN)

(73) Assignee: HUIZHOU TCL MOBILE COMMUNICATION CO., LTD, Guangdong (CN)

( * ) Notice: Subject to any disclaimer, the term of this patent is extended or adjusted under 35 U.S.C. 154(b) by 351 days.

(21) Appl. No.: 13/810,795

(22) PCT Filed: Nov. 5, 2011

(86) PCT No.: PCT/CN2011/081837

§ 371 (c)(1), (2), (4) Date: Jan. 17, 2013

(87) PCT Pub. No.: WO2012/075868

PCT Pub. Date: Jun. 14, 2012

(65) Prior Publication Data

US 2013/0120212 A1 May 16, 2013

(30) Foreign Application Priority Data

Dec. 7, 2010 (CN) .......................... 2010 1 0576925

(51) Int. Cl.

*H01Q 17/00* (2006.01)
*H01Q 1/24* (2006.01)
*H01Q 15/00* (2006.01)

(52) U.S. Cl.

CPC ............ *H01Q 17/008* (2013.01); *H01Q 1/245* (2013.01); *H01Q 15/006* (2013.01); *Y02B 60/50* (2013.01)

(58) Field of Classification Search

CPC .... H01Q 15/006; H01Q 1/245; H01Q 17/008
USPC .......................................................... 343/909
See application file for complete search history.

(56) References Cited

U.S. PATENT DOCUMENTS 6,426,722 B1 * 7/2002 Sievenpiper et al. .. 343/700 MS
7,081,865 B2 * 7/2006 Wu et al. ....................... 343/872

* cited by examiner

*Primary Examiner* — Hoang V Nguyen
*Assistant Examiner* — Michael Bouizza
(74) *Attorney, Agent, or Firm* — Shimokaji IP

(57) ABSTRACT

An antenna grounded with U-shaped high-impedance surface metal strips and its wireless communication device may include an antenna radiation unit and its ground plate, such that a plurality of high-impedance surface units are set in the ground plate at relevant intervals.

20 Claims, 4 Drawing Sheets

ANTENNA GROUNDED WITH U-SHAPED HIGH-IMPEDANCE SURFACE METAL STRIPS AND ITS WIRELESS COMMUNICATION DEVICE

FIELD OF THE INVENTION

The present invention relates to the antenna field of wireless communication devices, and more specifically to an antenna grounded with U-shaped high-impedance surface metal strips and its wireless communication device.

BACKGROUND TECHNOLOGY

The radio waves transmitted by a wireless communication device during communications may expose the user to measurable radio frequency (RF) radiation. When a user uses a mobile terminal such as a mobile phone to make a call, the head of the user is always within the electromagnetic radiation field emitted by the mobile phone. Therefore, many countries including the People's Republic of China have issued complete and safe standards and specifications to manage and restrict the problem of exposure of RF energy. Here, the specific absorption rate (SAR) is an important evaluation parameter, which refers to the electromagnetic wave energy absorption rate of mobile phones or wireless communication products. Popularly, SAR is used to measure whether the influence of mobile phone radiation upon the body of a user, especially, the head of the user conforms to the relevant standards. SAR is also a unit for measuring the amount of RF energy absorbed by the body when using a mobile phone, and is used as a criterion for body protection.

Presently, mobile terminals have been designed for use in such very rigid limitations, so various devices and methods are being developed to reduce the SAR, for example, materials for absorbing electromagnetic waves are added to mobile terminals, or metal parts are arranged properly to optimize the RF-induced current, complicated antenna design is used to reduce the SAR, and so on. However, these design methods are easily affected by the type of mobile terminals, so they do not have universal applicability.

Therefore, there is a need to improve and develop the prior art.

DESCRIPTION OF THE INVENTION

The purpose of the present invention is to provide an antenna grounded with U-shaped high-impedance surface metal strips and its wireless communication device, which not only can reduce the antenna radiation on human body, but also can avoid the influence upon communication quality, and have universal applicability.

The technical scheme of the present invention is as follows: an antenna grounded with U-shaped high-impedance surface metal strips, comprising an antenna radiation unit and its ground plate, such that a plurality of high-impedance surface units are set on the ground plate in relevant intervals; each high-impedance surface unit may include three high-impedance surface metal strips connected to each other in U shape; high-impedance surface through holes are set at the bottom side of the U shape; and the high-impedance surface units are connected to each other by means of the high-impedance surface through holes.

In the antenna grounded with U-shaped high-impedance surface metal strips, the ground plate may be a printed circuit board (PCB), the high-impedance surface units may be located on the surface of the PCB, and the high-impedance surface through holes may be set to pass through the PCB.

In the antenna with grounded with U-shaped high-impedance surface metal strips, the line breadth of the high-impedance surface metal strip may be about 1 mm, the width of the U-shaped high-impedance surface unit may be about 6 mm, the height of the U-shaped high-impedance surface unit may be about 8 mm, and the interval between the high-impedance surface units may be about 0.5 mm.

In the antenna grounded with U-shaped high-impedance surface metal strips, the U-shaped high-impedance surface units may be set on the ground plate to form rows.

In the antenna grounded with U-shaped high-impedance surface metal strips, the high-impedance surface metal strips on the bottom side of the U shape may be substantially parallel with the rows formed by the high-impedance surface units.

In the antenna grounded with U-shaped high-impedance surface metal strips, the U-shaped high-impedance surface units may be set on the ground plate to form columns.

In the antenna grounded with U-shaped high-impedance surface metal strips, the high-impedance surface metal strips on both sides of the U shape may be substantially parallel with the columns formed by the high-impedance surface units.

In the antenna grounded with U-shaped high-impedance surface metal strips, the corresponding high-impedance metal strips between the U-shaped high-impedance surface units may be substantially parallel with each other.

In the antenna grounded with U-shaped high-impedance surface metal strips, the antenna radiation unit may be a planar inverted F-type antenna.

A wireless communication device may comprise a case and an antenna for communications, the antenna being set outside the case and comprising an antenna radiation unit and its ground plate. A plurality of high-impedance surface units may be set on the ground plate in relevant intervals. Each high-impedance surface unit may include three high-impedance surface metal strips connected to each other in U shape. High impedance surface through holes may be set at the bottom side of the U shape; and the high-impedance surface units may be connected to each other by means of the high-impedance surface through holes.

The antenna grounded with U-shaped high-impedance surface metal strips and its wireless communication device according to the present invention may use a plurality of high-impedance surface units connected to each other by means of a high-impedance surface through holes and formed to a U shape by three high-impedance surface metal strips, such that on one hand the propagation of surface waves along its surface may be suppressed or blocked. On the other hand the same phase may reflect the incident plane wave substantially perpendicular to its surface. The capability of the high-impedance surface in suppressing surface waves may be utilized, and the high-impedance surface may be placed around the antenna, which may reduce the radiation in the head direction (that is, the radiation of the antenna of the wireless communication device in the human body direction is reduced), and decrease the SAR. The energy of the plane wave may not be thereby reduced, avoiding an influence upon the signal strength. In addition, the antenna radiation performance may not be reduced, the communication quality may not be affected, and the invention may have universal applicability.

PARTICULAR EMBODIMENTS

In the following, particular implementation modes and embodiments of the present invention will be further described with the combination of the drawings. The particular embodiments described here are used only for explaining the present invention and are not intended to limit the specific modes of implementing the present invention.

Figure 1:
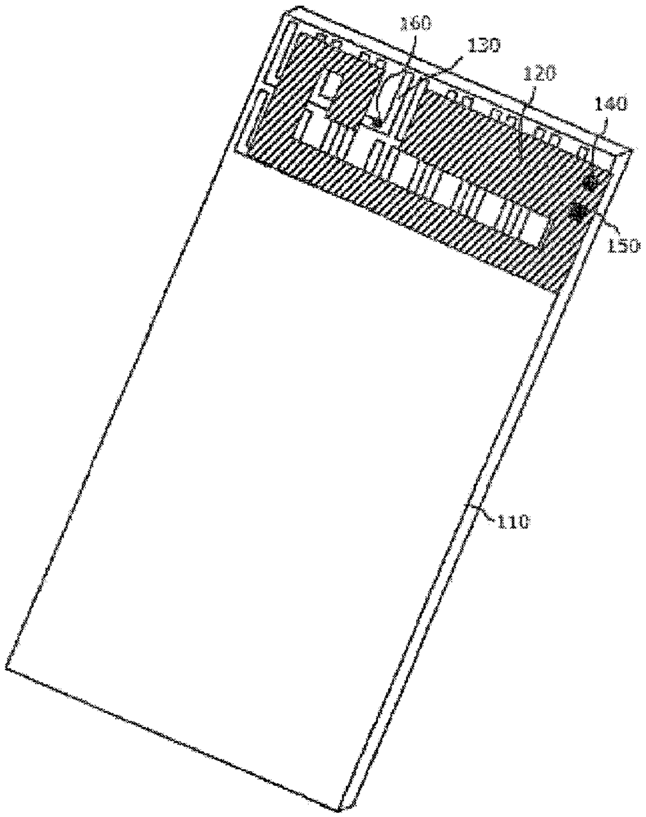
FIG. 1 is the schematic diagram of the spatial structure of the antenna grounded with U-shaped high-impedance surface metal strips in the present invention.

In one embodiment as shown in FIG. 1, the antenna grounded with U-shaped high-impedance surface metal strips of the present invention may comprise an antenna radiation unit 120 and its ground plate 110. A plurality of high-impedance surface units may be set on the ground plate 110 in relevant intervals. Each high-impedance surface unit may include three high-impedance surface metal strips 130 connected to each other in a U shape. A high-impedance surface through holes 160 may be set in the high-impedance surface metal strips 130 at the bottom side of the U shape; and the high-impedance surface metal strips 130 between the high-impedance surface units may be connected to each other by means of the high-impedance surface through holes 160.

Based on the antenna grounded with U-shaped high-impedance surface metal strips 130, the present invention also may provide a wireless communication unit, which in one embodiment may comprise a case and an antenna for communications. The antenna may be set inside the case and may comprise an antenna radiation unit 120 and its ground plate 110. A plurality of high-impedance surface units may be set on the ground plate 110 in relevant intervals. Each high-impedance surface unit may include three high-impedance surface metal strips 130 connected to each other in a U shape. A high-impedance surface through holes 160 may be set in the high-impedance surface metal strips 130 at the bottom side of the U shape. The high-impedance surface metal strips 130 between the high-impedance surface units may be connected to each other by means of the high-impedance surface through holes 160.

The high-impedance surface of the present invention refers to the surface structure that is built on the ground plate 110 of the antenna and can block the propagation of electromagnetic waves, that is, it has high-impedance characteristics to surface waves at a certain band. Specifically, on one hand, it can suppress surface waves of frequencies propagated on its surface within its stopbands or does not support the propagation of surface waves of certain bands within its stopbands. On the other hand, it may have the same-phase reflection effect for plane waves of incident frequencies substantially perpendicular to its surface within its stopbands. The phases of the reflection wave and incident wave may not change. Specifically, the ground plate 110 refers to the whole PCB, and the high-impedance surface replaces the partial ground plate 110 under the antenna.

For the incident plane wave substantially perpendicular to the metal surface, the metal surface may make the phase of the plane wave change by 180 degrees. If the ground plate 110 of the antenna is a complete metal plate, its surface propagates surface waves, and its impedance to surface waves may be zero, no matter whether the frequency is within its stopband. Compared with an antenna grounded with a complete metal plate and its wireless communication device in the prior art, the antenna grounded with U-shaped high-impedance surface metal strips and its wireless communication device of the present invention can suppress or block the propagation of surface waves along its surface on one hand and can also reflect the incident plane waves substantially perpendicular to its surface on the other hand, because it has the high-impedance surface units connected to each other by means of a plurality of high-impedance surface through holes 160 and three high-impedance surface metal strips 130 form a U shape. The characteristic of the high-impedance surface to suppress surface waves is utilized, and the high-impedance surface is placed around the antenna, which may reduce the radiation in the head direction (that is, the radiation of the antenna of the wireless communication device in the human body direction may be-reduced), and the SAR may be reduced. The energy of the plane wave is not weakened, avoiding influence upon the signal strength. The antenna radiation performance may not be reduced, and communication quality may not be affected, and the invention may have-universal applicability.

For example, the antenna radiation unit 120 may be a planar inverted F-type antenna. As shown in FIG. 1, there may be two branch parts with open circuits at terminals in the antenna radiation unit 120. Its operating principle may be about one-fourth wavelength resonance. A wider and shorter one on the external side may be the high-frequency branch part, and the narrower and longer one on the internal side may be the low-frequency branch part. It may be connected to the FR transmit/receive circuit of the PCB by means of the ground pin 140 of the antenna radiation unit 120 and the feed pin 150 of the antenna radiation unit 120.

Figure 2:
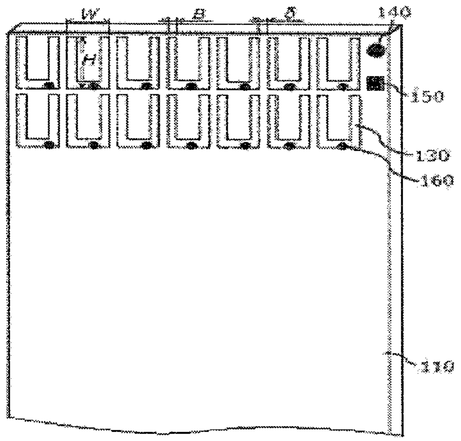
FIG. 2 is the schematic diagram of the U-shaped high-impedance surface unit set on the ground plate in the present invention.

In an embodiment of the antenna grounded with U-shaped high-impedance surface metal strips 130 and its wireless communication device of the present invention, as shown in FIG. 2, the ground plate 110 may be a PCB. The high-impedance surface units may be located on the surface of the PCB. The high-impedance surface through holes 160 may be set to pass through the PCB. The copper-clad layer on the surface of the PCB may be used to make the U-shaped high-impedance surface metal strips 130, and the through holes on the PCB may be used to make the high-impedance surface through holes 160.

Figure 3:
FIG. 3 is the side view of the structure of the antenna grounded with U-shaped high-impedance surface metal strips in the present invention.

As shown in FIG. 3, the high-impedance surface through holes 160 may be set to pass through the PCB. The U-shaped high-impedance surface metal strips 130 may be electrically connected to the lower surface metal layer of the PCB by means of the high-impedance surface through holes 160 at the bottom side, to implement grounding of the high-impedance surface units.

Specifically, the U-shaped high-impedance surface metal strips 130 may be set on the upper surface of the PCB, and the lower surface of the PCB may be composed of a complete metal layer. The U-shaped high-impedance surface metal strips 130 may be laid on the upper surface of the metal PCB as much as possible, especially in the lower region covered by the antenna radiation unit 120 to replace the original complete metal layer to serve as the new ground plane of the antenna radiation unit 120, to implement the transition of a zero-ohm ground plane to a ground plane with infinite impedance.

As shown in FIG. 2, the line breadth (B) of the high-impedance surface metal strip 130 may be about 1 mm, the width (W) of the U-shaped high-impedance surface unit may be about 6 mm, the height (H) of the U-shaped high-impedance surface unit may be about 8 mm, and the interval (δ) between the high-impedance surface units may be about 0.5 mm.

Further, the U-shaped high-impedance surface units may be set on the ground plate 110 to form rows. The high-impedance surface metal strips 130 on the bottom side of the U shape may be substantially parallel with the rows formed by the high-impedance surface units. And the U-shaped high-impedance surface units may be set on the ground plate 110 to form columns, such that the high-impedance surface metal strips 130 on both sides of the U shape may be substantially parallel with the columns formed by the high-impedance surface units.

The corresponding high-impedance metal strips between the U-shaped high-impedance surface units may be substantially parallel with each other. Of course, the high-impedance surface metal strips 130 at both sides and/or at the bottom in the U-shaped high-impedance surface units can form substantially slanted rows or columns with the high-impedance surface units.

The dielectric constant and thickness of the PCB may affect the structural size of the U-shaped metal strips, so during the design the length and width of the U-shaped metal strips and the intervals among the U-shaped metal strips can be adjusted properly to optimize the operating band of the high-impedance surface unit so that it is located within the transmit (Tx) channel range of the communication mode.

Figure 5:
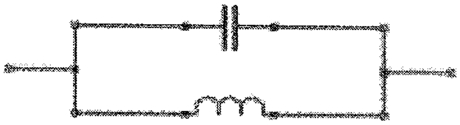
FIG. 5 is the schematic diagram of equivalent circuit of the U-shaped high-impedance surface unit set on the ground plate in the present invention.

The antenna and its wireless communication device of the present invention may use the U-shaped high-impedance surface metal strips 130 for grounding, and the electromagnetic characteristics of this structure can be described with IC components, capacitance and inductance. Its equivalent circuit parameter can be presented with a substantially parallel resonance LC circuit, as shown in FIG. 5. Its function can be regarded as a two-dimensional electric filter to block the current from flowing along its surface.

Figure 4:
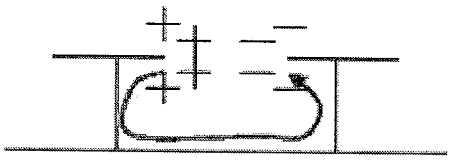
FIG. 4 is the schematic diagram of operating principle of the U-shaped high-impedance surface unit set on the ground plate in the present invention.

As shown in FIG. 4, when the U-shaped metal strips and the ground through holes interact with electromagnetic waves, an induced current may be generated on the U-shaped metal strips, which may be substantially parallel with the voltage function at the top surface, resulting in accumulative charges at both ends of the U-shaped metal strips. Therefore, it can be equivalent to the capacitive effect. However, charges flow from and to the metal through holes and the lower surface of the PCB to form a current loop, which may be connected to the magnetic field and inductance. FIG. 4 shows its capacitance and inductance, and FIG. 5 shows its equivalent resonance circuit.

When lower than the resonance frequency, the surface impedance may present inductance. When higher than the resonance frequency, the surface impedance may present capacitance. In the proximity of the resonance frequency, the surface impedance may be a very large value, which may be equivalent to an infinite value. During design, if the resonance of the unit structure of the U-shaped metal strips and through holes is made be within the wireless Tx channel band of the communication mode, the structure may generate an infinite impedance within this band to block the pass of the RF surface current, so as to reduce the SAR within this band.

Figure 6:
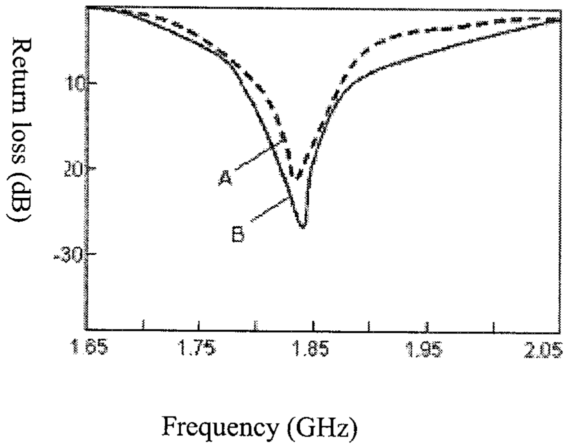
FIG. 6 shows the comparison between the return loss test curves of the antenna with the U-shaped high-impedance surface units and the antenna without the U-shaped high-impedance surface units in the wireless communication unit of the present invention.

As shown in FIG. 6, the dotted line A shows the return loss test curve of the planar inverted F-type antenna when the high-impedance surface units are grounded. The solid line B shows the return loss test curve of the planar inverted F-type antenna when the high-impedance surface units are not grounded. The curve A shows that the U-shaped high-impedance surface metal strips 130 and the high-impedance surface through holes 160 do not have great influence. Therefore, the radiation performance is basically not affected.

Figure 7:
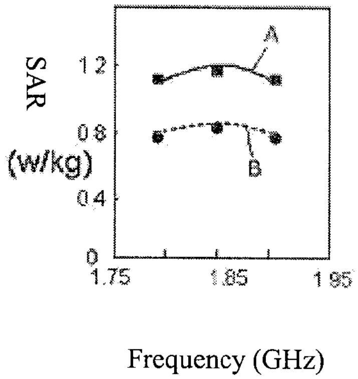
FIG. 7 shows the comparison between the SAR test curves of the antenna with the U-shaped high-impedance surface units and the antenna without the U-shaped high-impedance surface units in the wireless communication unit of the present invention.

As shown in FIG. 7, the dotted line A shows the SAR test curve of the planar inverted F-type antenna when the high-impedance surface units are grounded. The solid line B shows the SAR test curve of the planar inverted F-type antenna when the high-impedance surface units are not grounded. The curve A shows that the U-shaped high-impedance surface metal strips 130 and the high-impedance surface through holes 160 can effectively reduce the SAR, and the SAR of the same frequency can be reduced by about 30%.

It should be understood that the above are only preferred embodiments of the present invention and are not intended to limit the technical scheme of the present invention. Without departing from the spirit and principle of the present invention, those skilled in the art can add, decrease, replace, change or improve the present invention according to the preceding descriptions, for example, the antenna radiation unit 120 includes but is not limited to the planar inverted F-type antenna (e.g., it can be a multi-band antenna). Therefore, all technical schemes after such addition, decrease, replacement, change or improvement should fall within the protection scope defined by the accompany claims of the present invention.

The invention claimed is:

1. An antenna grounded with U-shaped high-impedance surface metal strips, comprising:

an antenna radiation unit including a ground plate;

a plurality of high-impedance surface units set on the ground plate at relevant intervals, wherein the high-impedance surface units are electrically isolated from the ground plate, and wherein each high-impedance surface unit includes three high-impedance surface metal strips connected to each other in a U shape; and high-impedance surface through holes set at the bottom side of the U shape, wherein the high-impedance surface units are connected to each other via a metal layer that is electrically isolated from the ground plate by means of the high-impedance surface through holes such that a specific absorption rate of the antenna is lowered.

2. The antenna grounded with U-shaped high-impedance surface metal strips of claim 1, wherein the ground plate is a printed circuit board (PCB), the high-impedance surface units are located on the surface of the PCB, and the high-impedance surface through holes are set to pass through the PCB.

3. The antenna grounded with U-shaped high-impedance surface metal strips of claim 1, wherein a line breadth of one of the high-impedance surface metal strips is about 1 mm, the width of one of the U-shaped high-impedance surface units is about 6 mm, the height of one of the U-shaped high-impedance surface units is about 8 mm, and the interval between the plurality of high-impedance surface units is about 0.5 mm.

4. The antenna grounded with U-shaped high-impedance surface metal strips of claim 1, wherein the U-shaped high-impedance surface units are set in the ground plate in the form of rows.

5. The antenna grounded with U-shaped high-impedance surface metal strips of claim 4, wherein the high-impedance surface metal strips on the bottom side of the U shape are substantially parallel with the rows formed by the high-impedance surface units.

6. The antenna grounded with U-shaped high-impedance surface metal strips of claim 1, wherein the U-shaped high-impedance surface units are set in the ground plate in the form of columns.

7. The antenna grounded with U-shaped high-impedance surface metal strips of claim 6, wherein the high-impedance surface metal strips on both sides of the U shape are substantially parallel with the columns formed by the high-impedance surface units.

8. The antenna grounded with U-shaped high-impedance surface metal strips of claim 1, wherein the high-impedance metal strips are substantially parallel with each other.

9. The antenna grounded with U-shaped high-impedance surface metal strips of claim 1, wherein the antenna is a planar inverted F-type antenna.

10. A wireless communication device, comprising:

a case and an antenna for communications, wherein the antenna is set outside the case and the antenna comprises an antenna radiation unit and a ground plate;

a plurality of high-impedance surface units on the ground plate at intervals, wherein the high-impedance surface units are electrically isolated from the ground plate, and wherein each of the plurality of high-impedance surface units includes three high-impedance surface metal strips connected to each other in a U shape, and high-impedance surface through holes are set at the bottom side of the U shape; and wherein the plurality of high-impedance surface units are connected to each other via a metal layer that is electrically isolated from the ground plate by means of the high-impedance surface through holes to interact with electromagnetic waves, that are radiated by the antenna, to induce a current in the ground plate that is substantially parallel to a voltage on a to surface of the high-impedance surface units.

11. The wireless communication device of claim 10, wherein the plurality of high-impedance surface units are capacitive in response to the impedance of the high-impedance surface units being higher than a resonance frequency.

12. The wireless communication device of claim 10, wherein the plurality of high-impedance surface units are inductive in response to the impedance of the high-impedance surface units being lower than a resonance frequency.

13. The wireless communication device of claim 10, wherein the high-impedance surface metal strips form substantially slanted rows or columns relative to a surface of the ground plate.

14. The wireless communication device of claim 10, wherein the U-shaped high-impedance surface units are set on the ground plate in the form of rows.

15. The wireless communication device of claim 14, wherein the high-impedance surface metal strips are on the bottom side of the U shape and are substantially parallel with the rows formed by the high-impedance surface units.

16. The wireless communication device of claim 10, wherein the U-shaped high-impedance surface units are set in the ground plate in the form of columns.

17. The wireless communication device of claim 16, wherein the high-impedance surface metal strips on both sides of the U shape are substantially parallel with the columns formed by the high-impedance surface units.

18. The antenna grounded with U-shaped high-impedance surface metal strips of claim 1, wherein the plurality of high-impedance surface units are capacitive in response to the impedance of the plurality of high-impedance surface units being higher than a resonance frequency.

19. The antenna grounded with U-shaped high-impedance surface metal strips of claim 1, wherein the plurality of high-impedance surface units are inductive in response to the impedance of the plurality of high-impedance surface units being lower than a resonance frequency.

20. The antenna grounded with U-shaped high-impedance surface metal strips of claim 1, wherein the high-impedance surface metal strips form substantially slanted columns relative to a surface of the ground plate.

* * * * *